(12) United States Patent
Kline et al.

(10) Patent No.: US 11,796,959 B2
(45) Date of Patent: Oct. 24, 2023

(54) AUGMENTED IMAGE VIEWING WITH THREE DIMENSIONAL OBJECTS

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 239 days.

(21) Appl. No.: 16/257,264

(22) Filed: Jan. 25, 2019

(65) Prior Publication Data

US 2020/0241470 A1 Jul. 30, 2020

(51) Int. Cl.
G03H 1/00 (2006.01)
G03H 1/02 (2006.01)
G06F 16/583 (2019.01)

(52) U.S. Cl.
CPC ......... *G03H 1/0248* (2013.01); *G03H 1/0005* (2013.01); *G06F 16/583* (2019.01)

(58) Field of Classification Search
CPC .......... G03H 1/24; G03H 1/26; G03H 1/0248; G03H 1/0005; G06F 16/583
USPC ...................................................... 359/22
See application file for complete search history.

(56) References Cited

U.S. PATENT DOCUMENTS

| | | |
|---|---|---|
| 6,760,134 B1 | 7/2004 | Schilling et al. |
| 8,233,206 B2 | 7/2012 | Kramer et al. |
| 9,224,241 B2 | 12/2015 | Son |
| 9,317,971 B2 | 4/2016 | Lamb et al. |
| 9,367,136 B2 | 6/2016 | Latta et al. |
| 9,448,532 B2 | 9/2016 | Zschau et al. |
| 9,557,855 B2 | 1/2017 | Lawrence et al. |
| 10,846,552 B1* | 11/2020 | Wu ...................... G06V 10/255 |

(Continued)

FOREIGN PATENT DOCUMENTS

CN 102541442 A 7/2012

OTHER PUBLICATIONS

S. Manchanda and S. Sharma, "Identifying moving objects in a video using modified background subtraction and optical flow method," 2016 3rd International Conference on Computing for Sustainable Global Development (INDIACom), 2016, pp. 129-133. (Year: 2016).*

(Continued)

*Primary Examiner* — James C. Jones
*Assistant Examiner* — Henry Duong
(74) *Attorney, Agent, or Firm* — CANTOR COLBURN LLP; Tihon Poltavets

(57) ABSTRACT

Methods, systems and computer program products for displaying an augmented image using a holographic object via a mobile device are provided. Aspects include receiving, by a processor of the mobile device while displaying an image on a display screen of the mobile device, a user input. Aspects also include identifying a portion of the image based on the user input. Aspects further include outputting, by a holographic module of the mobile device, one or more dynamic holographic objects in three-dimensional space above the display screen, wherein the one or more dynamic holographic objects are determined at least in part based on the portion of the image identified.

12 Claims, 4 Drawing Sheets

(56) References Cited

U.S. PATENT DOCUMENTS

| | | | |
|---|---|---|---|
| 2003/0206320 A1 | 11/2003 | Cole et al. | |
| 2012/0170089 A1* | 7/2012 | Kim | G03H 1/2249 |
| | | | 359/9 |
| 2016/0085332 A1 | 3/2016 | Herrera-Morales et al. | |
| 2016/0253835 A1 | 9/2016 | Conness et al. | |
| 2016/0364003 A1 | 12/2016 | O'Brien | |
| 2017/0060089 A1 | 3/2017 | Tsang | |
| 2017/0060514 A1 | 3/2017 | Kaufthal | |
| 2017/0205766 A1 | 7/2017 | Brooker et al. | |
| 2018/0284692 A1* | 10/2018 | Kline | B29C 64/386 |
| 2019/0313084 A1* | 10/2019 | Chavez | G06T 15/205 |

OTHER PUBLICATIONS

Kim, Minju et al. "HoloStation: Augmented Visualization and Presentation", SA '16 Symposium on Visualization, Dec. 5-8, 2016, Macao; 9 pgs.

Page, Michael "Haptic holography/touching the ethereal", 2013, OCAD Univerisity Open Research Repository; Journal of Physics: Conference Series 415 (2013) 01241, 9th Int'l. Symposium on Display Holography (ISDH 2012); 10 pgs.

Rehm, Lars Apple patents 3D interactive hologram display system; published Apr. 25, 2014; retrieved from Internet: https://www.dpreview.com/articles/4107151306/apple-patents-3d-interactive-hologram-display-system; 6 pgs.

Mgnesh, M et al. "Implementation of Holographic View in Mobile Video Calls" International Journal of Advanced Research in Computer Science and Software Enbgineering; vol. 2, Issue 10, Oct. 2012; 8 pgs.

Yamaguchi, Masahiro et al. "3D touchable holographic light-field display", Article in Applied Optics, Jan. 2016; Research Gate at: https://www.researchgate.net/publication/291392021; 6 pgs.

\* cited by examiner

AUGMENTED IMAGE VIEWING WITH THREE DIMENSIONAL OBJECTS

BACKGROUND

The present invention relates generally to viewing images on a mobile device, and more specifically, to providing augmented image viewing on a mobile device by projecting holographic objects.

Mobile devices are often used to view images, such as photographs. Currently, different types of gesture-based photograph navigation are available in touchscreen enabled mobile devices. When users perform a gesture on the displayed image, appropriate visual parameters of the image are changed. For example, users can pinch to zoom in and out of the image.

SUMMARY

An embodiment of a computer-implemented method for displaying an augmented image using a holographic object via a mobile device is provided. The method includes receiving, by a processor of the mobile device while displaying an image on a display screen of the mobile device, a user input. The method also includes identifying a portion of the image based on the user input. The method further includes outputting, by a holographic module of the mobile device, one or more dynamic holographic, objects in three-dimensional space above the display screen, wherein the one or more dynamic holographic objects are determined at least in part based on the portion of the image identified.

An embodiment of a mobile device that displays an augmented image using a holographic object via a mobile device is provided. The mobile device includes a processor configured to receive, while displaying an image on a display screen of the mobile device, a user input. The processor is also configured to identify a portion of the image based on the user input. The processor is further configured to output, by a holographic module of the mobile device, one or more dynamic holographic objects in three-dimensional space above the display screen, wherein the one or more dynamic holographic objects are determined at least in part based on the portion of the image identified.

An embodiment of a computer program product for performing a processing action includes a computer readable storage medium having program instructions embodied therewith, the program instructions readable by a processing circuit to cause the processing circuit to perform a method. The method includes receiving, by a processor of the mobile device while displaying an image on a display screen of the mobile device, a user input. The method also includes identifying a portion of the image based on the user input. The method further includes outputting, by a holographic module of the mobile device, one or more dynamic holographic objects in three-dimensional space above the display screen, wherein the one or more dynamic holographic objects are determined at least in part based on the portion of the image identified.

BRIEF DESCRIPTION OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Apparatuses, systems, and methods for controlling the operation of a mobile device are provided. More specifically, apparatuses, systems, and methods for displaying an augmented photograph having a holographic object via a mobile device are provided. In exemplary embodiments, a mobile device, such as a smartphone, smartwatch or tablet, is configured to display an image, such as a photograph, on a display screen and to detect user input to a portion of the display screen while the photograph is being displayed. Responsive to the user input, the mobile device is configured to project a dynamic holographic object above the display screen. The holographic object projected is determined based on one or more of a content of the image, a type of the user input, and a location of the user input.

Figure 1:
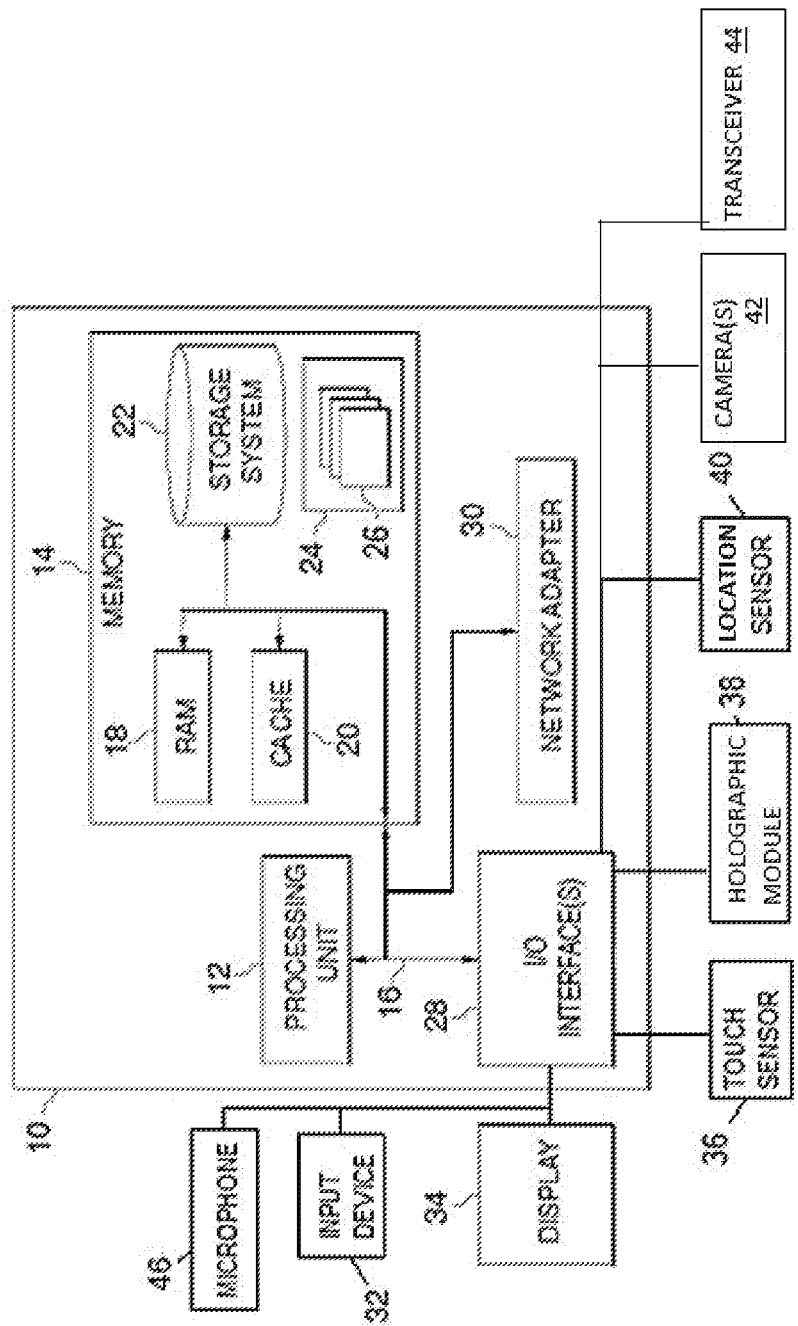
FIG. 1 depicts a block diagram of a mobile device in accordance with an embodiment.

Referring now to FIG. 1, an example of a mobile device 10 that can be used to perform various actions, including receiving and processing user inputs and performing various processing actions as described herein, including storing and processing data, executing programs and displaying information is shown. The mobile device 10 may be configured to receive or gather communications (e.g., data, text, spoken words, emails, authentication information, etc.) from other locations, such as a network (e.g., Internet) and/or another processor (e.g., server, computer or mobile device). The mobile device 10 may be any device capable of receiving user input, performing processing actions and displaying text and other information to a user, such as a mobile device (e.g., a smartphone), a wearable device (e.g., a smartwatch and/or fitness tracker), a tablet computer, a laptop computer, a desktop computer, a mainframe a server and others.

The mobile device 10 includes various components and/or modules for performing various processing, sensing and display functions. The mobile device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The mobile device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein.

The mobile device 10 includes or is connected to various components, which may be incorporated in the mobile device 10 or external to the mobile device 10. The mobile device 10 includes interfaces 28 for communication with components and may also include a network adapter 30 for communication with other devices or components over a suitable network or remote connection. The mobile device 10 is connected to or includes at least one input device 32 such as a keyboard, button, mouse and/or touchscreen, and a display 34. In one embodiment, the mobile device 10 also includes a location sensor 40 can be used for determining the location of the mobile device 10. The components shown in FIG. 1 and described herein are provided for illustrative purposes and are not intended to be limiting.

The mobile device 10 also includes a touch sensor 36 that is configured to detect contact and/or pressure from a user, e.g., via one or more fingers and/or other input devices such as styluses. The touch sensor 36 detects not only finger position, but also movements along a touchscreen. Movements of a finger or finger used an input to the mobile device 10 are referred to herein as movements, motions or swipes. In this way, the touch sensor 36 may be used by the mobile device 10, e.g., in conjunction with other input devices and program modules 26, to recognize an input performed by a user. Any suitable type of touch sensor 36 may be included in the device. For example, the touch sensor 36 is a capacitive or acoustic wave sensor. The touch sensor 36 may be located under a touchscreen or embedded within the touchscreen (e.g., between screen layers).

As described herein, an input refers to any interaction between a user and a touchscreen or other input device. An input may be a touch at some location on the touchscreen by an object (e.g., one or more fingers), a movement or swipe of the touching object or a combination thereof. The movement may include an extent (e.g., the distance along a path of the touch), speed and/or path of the movement along the touchscreen. Other aspects of an input may include, for example, an amount of pressure, a number of touches (e.g., single "click" or double-click), and any other criteria that may be used to discern the nature of the input and differentiate it relative to other inputs.

The mobile device 10 also includes one or more cameras 42. The cameras 42 include a front facing camera that is configured to capture images that include individuals that are looking at the display 34 of the mobile device 10. The processing unit 12 of the mobile device 10 is configured to perform facial recognition on the images captured by the camera 42 to identify one or more known individuals and to detect the presence of an unknown individual that is looking at the display 34 of the mobile device 10. The memory 14 of the mobile device 10 includes stored images of known individuals and a security profile that are used by the mobile device to determine whether to perform requested actions.

The mobile device 10 also includes a transceiver 44 that is configured to directly communicate with one or more electronic devices via any known protocol, such a Bluetooth. The one or more electronic devices can include a speaker or headset, a smartwatch, a television, a computer, an automobile, or the like. The mobile device 10 also includes a microphone 46 or other sound recording device may be included for recording voice commands and recording changes in voice or other audible indicators. The processing unit 12 of the mobile device 10 is configured to perform voice recognition on audio captured by the microphone 46 to identify one or more known individuals. The memory 14 of the mobile device 10 includes stored samples of known voices and a security profile that are used by the mobile device to determine whether to perform requested actions.

The mobile device 10 also includes a holographic module 38. The holographic module 38 is configured to project holographic objects can be into in mid-air above the display 34. In exemplary embodiments, the holographic objects are dynamic i.e., the holographic objects include one or more elements that appear to be moving. In exemplary embodiments, users can interact with the holographic objects with finger touch and/or various gestures. The user interactions can cause changes in the size, location and/or movement of the holographic objects. The mobile device 10 uses cameras 42 and sensors 36 used to capture interaction behavior of participating users from various angles to identify if a user is using a finger gesture to select and interact (i.e. selection, touch, etc.) with holographic objects.

According to an exemplary embodiment of the present invention, the holographic module 38 utilizes a laser pulse beam which generates a palpable light field at the one or more focal points. The discussion herein will often relate to outputting holographic objects in midair. However, such teachings with regard to a particular type of medium will generally apply to other types of mediums as well, such as, but not limited to, stream of one or more liquids, fog, fabric, stream of dust particles, and the like. Some embodiments further contemplate that a control region for each hologram may be spatially displaced (e.g., 1-2 inches to the right). In other words, users may manipulate their fingers, stylus or any other object configured to manipulate a selected 3D holographic object at some distance from the selected holographic object.

Figure 2:
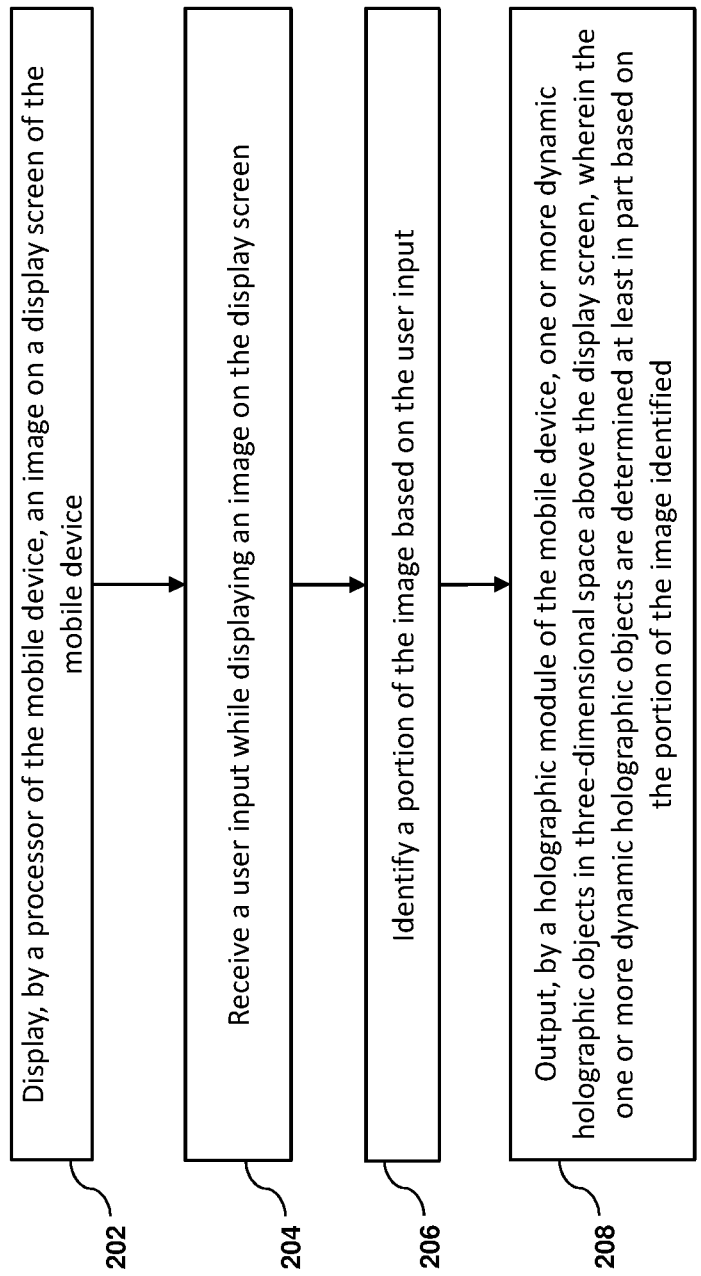
FIG. 2 depicts a flow diagram of a method for displaying an augmented image using a holographic object via a mobile device in accordance with an embodiment.

Referring now to FIG. 2 a flowchart illustrating a method 200 for displaying an augmented image using a holographic object via a mobile device is shown. As illustrated at block 202, the method 200 includes displaying, by a processor of the mobile device, an image on a display screen of the mobile device. Next, as shown at block 204, the method 200 includes receiving a user input while displaying an image on the display screen. In exemplary embodiments, the user input can include various type of user input including, but not limited to, a user touching a portion of the display screen, a user performing a gesture above a portion of the display screen or the like. The method 200 also includes identifying a portion of the image based on the user input. In exemplary embodiments, the portion of the image is identified based on a location of the user input relative to the display screen. Next, as shown at block 208, the method 200 includes outputting, by a holographic module of the mobile device, one or more dynamic holographic objects in three-dimensional space above the display screen, wherein the one or more dynamic holographic objects are determined at least in part based on the portion of the image identified.

In exemplary embodiments, the method 200 includes analyzing a content of the portion of the image to identify a reference object depicted in the portion of the image, wherein the one or more dynamic holographic objects are further determined at least in part based on the reference object. In one embodiment, the image is one of a series of images and the reference object is identified as a dynamic element in the portion of the image. In another embodiment, the reference object is determined by selecting an object depicted in the image nearest the user input for which holographic object is available.

In one example, an image includes running water, such as from a faucet or in a stream, upon the user providing input in the vicinity of the running water, a holographic object that appears to show water coming out of the screen is output by a holographic module. In exemplary embodiments, a type of the user input is identified and the one or more dynamic holographic objects are further determined at least in part based on a predicted reaction of the reference object to the type of the user input. Continuing with the above example, if the image depicts water coming out of a faucet the holographic object will be water spilling out of the display screen if the user input is a user placing their finger in the running water. However, if the user input is determined to be a user placing their finger at a mouth of the faucet, the holographic object will be water spraying out of the screen at a higher velocity.

In exemplary embodiments, the movement of the finger of the user that provides the user input on the display screen is monitored and the holographic object is responsively modified. Various characteristics of the holographic object can be modified based on the user input. These characteristics include, but are not limited to, a size of the holographic object, a location of the holographic object, and the dynamic nature of the holographic object. For example, the speed of the movement of a dynamic holographic object can change based on a detected change in the user input.

Figure 3:
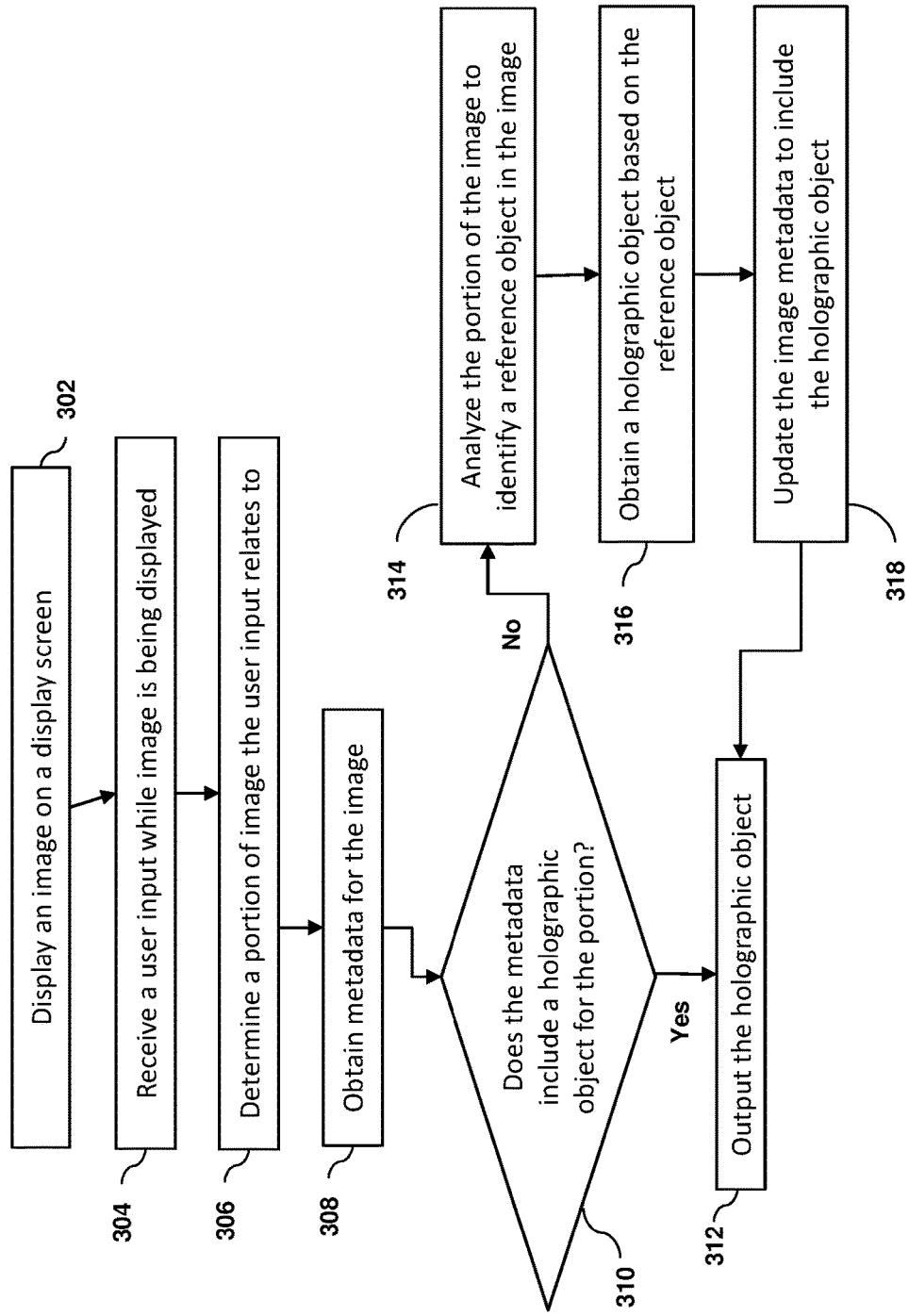
FIG. 3 depicts a flow diagram of another method displaying an augmented image using a holographic object via a mobile device in accordance with an embodiment.

FIG. 3 illustrates a flowchart of a method 300 for displaying an augmented image using a holographic object via a mobile device. As illustrated at block 302, the method 300 includes displaying an image on a display screen. Next, the method 300 includes receiving a user input while an image is being displayed, as shown at block 304. Next, as shown at block 306, the method 300 includes determining a portion of the image the user input relates to. The portion of the image the user input relates to can be determined based on the location of the user input relative to the display screen. Next, as shown at block 308, the method 300 includes obtaining metadata for the image. At decision block 310, the method 300 includes determining if the metadata of the image includes a holographic object for the identified portion. If so, the method 300 proceeds to block 312 and outputs the holographic object. Otherwise, the method 300 proceeds to block 314.

The method 300 includes analyzing the portion of the image to identify a reference object in the image, as shown at block 314. In exemplary embodiments, analyzing the portion of the image includes identifying an object that is dynamic in nature. In one embodiment, the image is one of a set of sequential images, such as part of a video, and identifying a reference object in the image includes comparing the sequential images to determine an object that moved across the set of sequential images. Next, as shown at block 316, the method 300 includes obtaining a holographic object based on the reference object. In one embodiment, the holographic object is obtained by performing a web search for a video of the reference object. The holographic object is then created based on a video result of the web search. In another embodiment, the holographic object is obtained by performing a web search for a holographic object of the reference object. Once the holographic object is obtained, the method 300 proceeds to block 318 and updates the image metadata to include the holographic object.

Figure 4:
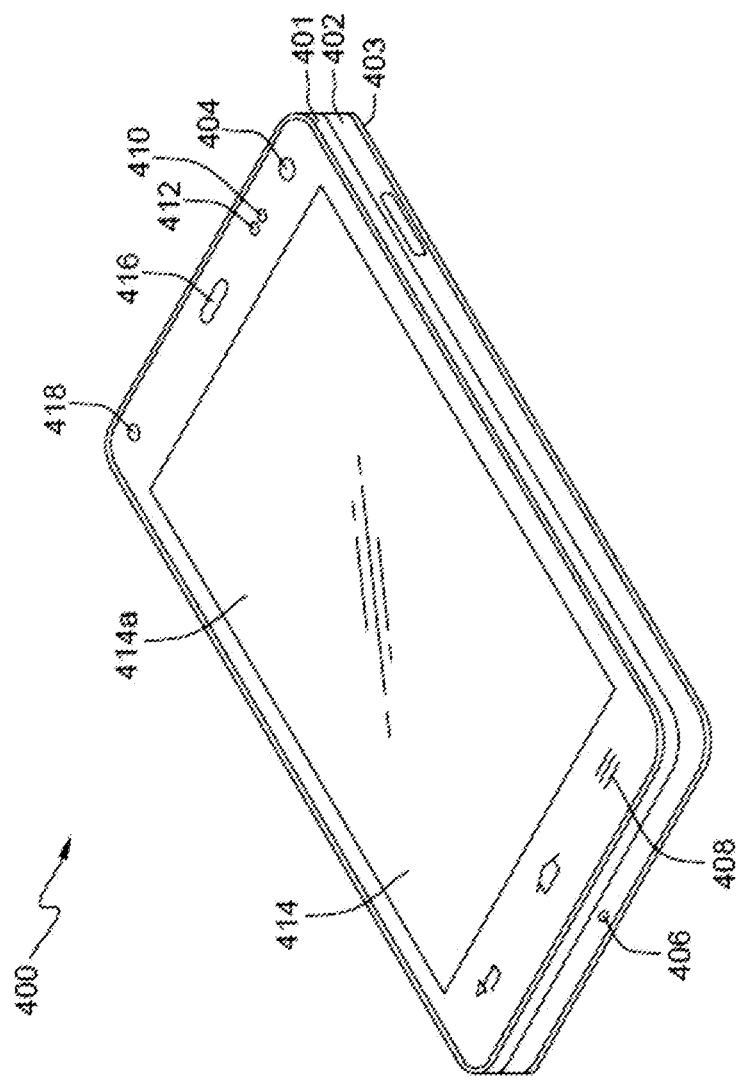
FIG. 4 depicts a mobile device in accordance with an embodiment.

Referring now to FIG. 4 a mobile device 400 in accordance with an exemplary embodiment of the present invention is shown. The mobile device 400 is described with reference to a bar-type terminal body. However, the mobile device 400 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. The discussion herein will often relate to a particular type of mobile device (for example, bar-type, watch-type, glasses-type, and the like). However, such teachings with regard to a particular type of mobile device will generally apply to other types of mobile devices as well.

The mobile device 400 will generally include a case (for example, frame, housing, cover, and the like) forming the appearance of the device. In this embodiment, the case is formed using a front case 401 and a rear case 402. Various electronic components are incorporated into a space formed between the front case 401 and the rear case 402. At least one middle case may be additionally positioned between the front case 401 and the rear case 402.

The display unit 414 is shown located on the front side of the device body to output information. As illustrated, a window 414a of the display unit 414 may be mounted to the front case 401 to form the front surface of the device body together with the front case 401.

In some embodiments, electronic components may also be mounted to the rear case 402. Examples of such electronic components include a detachable battery, an identification module, a memory card, and the like. Rear cover 403 is shown covering the electronic components, and this cover may be detachably coupled to the rear case 402. Therefore, when the rear cover 403 is detached from the rear case 402, the electronic components mounted to the rear case 402 are externally exposed.

If desired, the mobile device 400 may include a waterproofing unit for preventing the introduction of water into the terminal body. For example, the waterproofing unit may include a waterproofing member which is located between the window 414a and the front case 401, between the front case 401 and the rear case 402, or between the rear case 402 and the rear cover 403, to hermetically seal an inner space when those cases are coupled.

The mobile device 400 may be provided with the display unit 414, the holography module 416, the proximity sensor 410, the illumination sensor 412, the projector module 418, the camera 404, the manipulating unit 408, the microphone 406, and the like.

FIG. 4 depicts certain components as arranged on the mobile device. However, alternative arrangements are possible and within the teachings of the instant disclosure. Some components may be omitted or rearranged. For example, the manipulation unit 408 may be located on another surface of the device body.

The display unit 414 outputs information processed in the mobile device 400. The display unit 414 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 414 may be implemented using two display devices, which can implement the same or different display technology. For instance, a plurality of the display units 414 may be arranged on one side, either spaced apart from each other, or these devices may be integrated, or these devices may be arranged on different surfaces.

The manipulation unit 408 is an example of the user input unit, which may be manipulated by a user to provide input to the mobile device 400. The manipulation unit 408 may also be commonly referred to as a manipulating portion and may employ any tactile method that allows the user to perform manipulation such as touch, push, scroll, or the like. The manipulation unit 408 may also employ any non-tactile method that allows the user to perform manipulation such as proximity touch, hovering, or the like.

FIG. 4 illustrates the manipulation unit 408 as a touch key, but possible alternatives include a mechanical key, a push key, a touch key, and combinations thereof. Input received at the manipulation unit 408 may be used in various ways. For example, the manipulation unit 408 may be used by the user to provide an input to a menu, home key, cancel, search, or the like.

The microphone 406 is shown located at an end of the mobile device 400, but other locations are possible. If desired, multiple microphones may be implemented, with such an arrangement permitting the receiving of stereo sounds.

Meanwhile, the mobile device 400, according to one embodiment of the present invention, may further include a projector module 418 and/or a holography module 416. The projector module 418 may perform an image projector function using the mobile device 400. The projector module 418 may display an object identical to or partially different from the image displayed on the display 414 on an external screen or wall according to a control signal of a controller.

The projector module 418 may be classified into a CRT (cathode ray tube) module, LCD (liquid crystal display) module and a DLP (digital light processing) module in accordance with a display device type. Particularly, the DLP module may enable an image, which is generated by reflecting light generated from the light source on a DMD (digital micro-mirror device) chip, to be enlarged and projected. It may be advantageous in reducing the size of the projector module 418.

Preferably, the projector module 418 can project the object toward a prescribed direction. It is apparent that the projector module 418 may be disposed at any position of the mobile device 400, if necessary. The holography module 416 can include a holography storage unit, a holography output unit and, if necessary, a holography reflecting unit. The holography module 416 can be configured to output a 3D holographic object on a preset space. In exemplary embodiments, once the holography module 418 begins outputting the holographic objects, the display unit stops displaying the image on the display screen of the mobile device.

The terminal body may be provided with the holography module 416. The holography module 416 may be configured to output a holographic object above the front surface of the mobile device body, for example, at a space on the display unit 414. The drawings exemplarily illustrate that the holography module 416 is disposed on the front surface of the mobile device 400. The holography module 416 may be disposed on the rear surface of the terminal body to output a holographic object to a space on the rear surface.

Technical effects and benefits include the ability for a mobile device that is configured to display images and to project dynamic holographic objects to enhance the display of the image. In exemplary embodiments, user engagement and utility of the mobile device is increased by providing a user with an interactive three dimensional viewing experience of images that were traditionally viewed as static two dimensional images.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of displaying an augmented photograph using a holographic object via a mobile device, the method comprising:
    device;
    displaying a photograph of a series of photographs on a display screen of the mobile obtaining a metadata for the photograph;
    receiving, by a processor of the mobile device a user input;
    identifying a portion of the photograph based on the user input;
    analyzing a content of the portion of the photograph to identify a reference object depicted in the portion of the photograph, wherein the reference object is a dynamic element in the portion of the photograph;
    outputting, by a holographic module of the mobile device, one or more dynamic holographic objects in three-dimensional space above the display screen, wherein the one or more dynamic holographic objects are determined at least in part based on the reference object, wherein the one or more dynamic holographic objects are obtained from the metadata for the photograph and by performing a web search for a video of the reference object based on a determination that the metadata does not include the one or more dynamic holographic objects; and
    updating the metadata of the photograph, based on the results of the web search, to include the one or more dynamic holographic objects,
    wherein the identification of the dynamic element is based on a determination that the reference object appears to be moving in the series of photographs.

2. The method of claim 1, further comprising identifying a type of the user input.

3. The method of claim 2, wherein the one or more dynamic holographic objects are further determined at least in part based on a predicted reaction of the reference object to the type of the user input.

4. The method of claim 1, wherein the user input includes a user touching a portion of the display screen with a finger.

5. The method of claim 4, further comprising monitoring a movement of the finger on the display screen and modifying the one or more dynamic holographic objects in response to the movement.

6. A mobile device comprising:
a sensor configured to receive an input from a user; and
a processor configured to:
displaying a photograph of a series of photographs on a display screen of the mobile device;
obtain a metadata for the photograph;
receive a user input;
identify a portion of the photograph based on the user input;
analyze a content of the portion of the photograph to identify a reference object depicted in the portion of the photograph, wherein the reference object is a dynamic element in the portion of the photograph;
output, by a holographic module of the mobile device, one or more dynamic holographic objects in three-dimensional space above the display screen, wherein the one or more dynamic holographic objects are determined at least in part based on the reference object, wherein the one or more dynamic holographic objects are obtained from the metadata for the photograph and by performing a web search for a video of the reference object based on a determination that the metadata does not include the one or more dynamic holographic objects; and
updating the metadata of the photograph, based on the results of the web search, to include the one or more dynamic holographic objects,
wherein the identification of the dynamic element is based on a determination that the reference object appears to be moving in the series of photographs.

7. The mobile device of claim 6, wherein the processor is further configured to analyze identify a type of the user input.

8. The mobile device of claim 6, wherein the processor is further configured to cease displaying the photograph on the screen of the mobile device upon outputting the one or more dynamic holographic objects.

9. The mobile device of claim 6, wherein the input includes a user touching a portion of the display screen with a finger.

10. The mobile device of claim 9, wherein the processor is further configured to monitor a movement of the finger on the display screen and modifying the one or more dynamic holographic objects in response to the movement.

11. The mobile device of claim 6, wherein the input includes a movement of a finger of a user detected by a camera of the mobile device.

12. A computer program product for performing a processing action, the computer program product comprising:
a non-transitory computer readable storage medium having program instructions embodied therewith, wherein the computer readable storage medium is not a signal, the program instructions readable by a processing circuit to cause the processing circuit to perform a method comprising:
displaying a photograph of a series of photographs on a display screen of the mobile device;
receiving, by a processor of a mobile device, a user input;
obtaining a metadata for the photograph;
identifying a portion of the photograph based on the user input;
analyzing a content of the portion of the photograph to identify a reference object depicted in the portion of the photograph, wherein the reference object is a dynamic element in the portion of the photograph;
outputting, by a holographic module of the mobile device, one or more dynamic holographic objects in three-dimensional space above the display screen, wherein the one or more dynamic holographic objects are determined at least in part based on the reference object, wherein the one or more dynamic holographic objects are obtained from the metadata for the photograph and by performing a web search for a video of the reference object based on a determination that the metadata does not include the one or more dynamic holographic objects; and
updating the metadata of the photograph, based on the results of the web search, to include the one or more dynamic holographic objects,
wherein the identification of the dynamic element is based on a determination that the reference object appears to be moving in the series of photographs.

\* \* \* \* \*